(12) United States Patent
Ulman et al.

(10) Patent No.: US 6,564,626 B2
(45) Date of Patent: *May 20, 2003

(54) APPARATUS AND METHOD FOR MEASURING FORCES AND MOMENTS ACTING ON MODELS TESTED IN AERODYNAMIC WIND TUNNELS

(75) Inventors: Richard J. Ulman, Bellevue, WA (US); William R. Teman, Redmond, WA (US); David A. Rohrig, Seattle, WA (US)

(73) Assignee: The Boeing Company, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/449,856

(22) Filed: Nov. 26, 1999

(65) Prior Publication Data

US 2002/0092348 A1 Jul. 18, 2002

(51) Int. Cl.[7] .............................................. G01M 9/00
(52) U.S. Cl. ....................................................... 73/147
(58) Field of Search .......................... 73/147 OR, 865.6, 73/862.65, 862.044, 862.04; 33/558

(56) References Cited

U.S. PATENT DOCUMENTS

| | | |
|---|---|---|
| 3,613,443 A | 10/1971 | Curry |
| 4,074,567 A | 2/1978 | Horanoff |
| 4,107,986 A | 8/1978 | Jones |
| 4,112,752 A | 9/1978 | Häfner et al. |
| 4,414,838 A | * 11/1983 | Ward et al. ....................... 73/1 |
| 4,448,083 A | * 5/1984 | Hayashi .................. 73/862.04 |
| 4,815,855 A | 3/1989 | Dixon |
| 4,862,739 A | 9/1989 | Dobbs |
| 4,866,854 A | * 9/1989 | Settzer ........................ 33/558 |
| 4,938,059 A | 7/1990 | Faucher et al. |
| 5,201,218 A | 4/1993 | Mole |
| 5,279,144 A | 1/1994 | Levkowitch |
| 5,446,546 A | 8/1995 | Breidenbach et al. |
| 5,663,497 A | 9/1997 | Mole |
| 5,889,214 A | * 3/1999 | Kang et al. ............ 73/862.044 |

* cited by examiner

Primary Examiner—Helen Kwok
Assistant Examiner—Tamiko Bellamy
(74) Attorney, Agent, or Firm—Conrad O. Gardner

(57) ABSTRACT

A simultaneous measurement of small displacements, from which forces, moments, pressures, and other physical quantities can be determined, with a high degree of precision and accuracy. A computer may be used to resolve the displacement into the applied loads. More specifically, a class of precision instruments is provided whose chief task is to resolve the applied loads acting on a body into their component forces and moments relative to a fixed coordinated axis system. This class of instruments includes the measurement of forces and moments acting on models tested in aerodynamic wind tunnel facilities.

3 Claims, 4 Drawing Sheets

APPARATUS AND METHOD FOR MEASURING FORCES AND MOMENTS ACTING ON MODELS TESTED IN AERODYNAMIC WIND TUNNELS

FIELD OF THE INVENTION

This invention relates to a method and apparatus for measurement of forces and moments using a displacement sensor.

BACKGROUND OF THE INVENTION

The measurement of loads, both forces and moments, with accuracy and precision is important to many applications. A common use, where several moments and forces need to be measured, is in the testing of aerodynamic models in a wind tunnel. These devices, known as balances, typically come in two types. One of these is a strain-gauged device, which utilizes load cells or flexural elements. These are limited by the accuracy that the strain can be measured. Often the strain required to achieve adequate output causes fatigue in the flexural elements. Prior art for this type of balance includes U.S. Pat. No. 3,613,443, assigned to The Boeing Company. In contrast, the present instrument utilizes displacement sensors that are independent from the flexural elements. The second type is a null type balance. Typically these are made up of a very complex series of linkages that separate the forces and moments. The forces and moments are then reacted with a force generating device that returns the balance to a null position. These balances are nominally very complicated and generally more flexible than a strain gauge balance. The complexity often leads to designs that are expensive to design, fabricate, and maintain, and are also large in size. The flexibility of the balance results in movement of the balance calibration center, causing additional uncertainties to the data.

BRIEF SUMMARY OF THE INVENTION

This invention represents a simplified configuration for a highly accurate multi-component force and moment transducer. Loads are applied causing the transducer to deflect. These deflections are measured with several displacement transducers. The measurements are then combined in an algorithm that resolves the displacements into forces and moments. The algorithm is based on geometry as well as on a calibration to establish relationships between the displacements and loads.

DETAILED DESCRIPTION OF THE INVENTION

Figure 1:
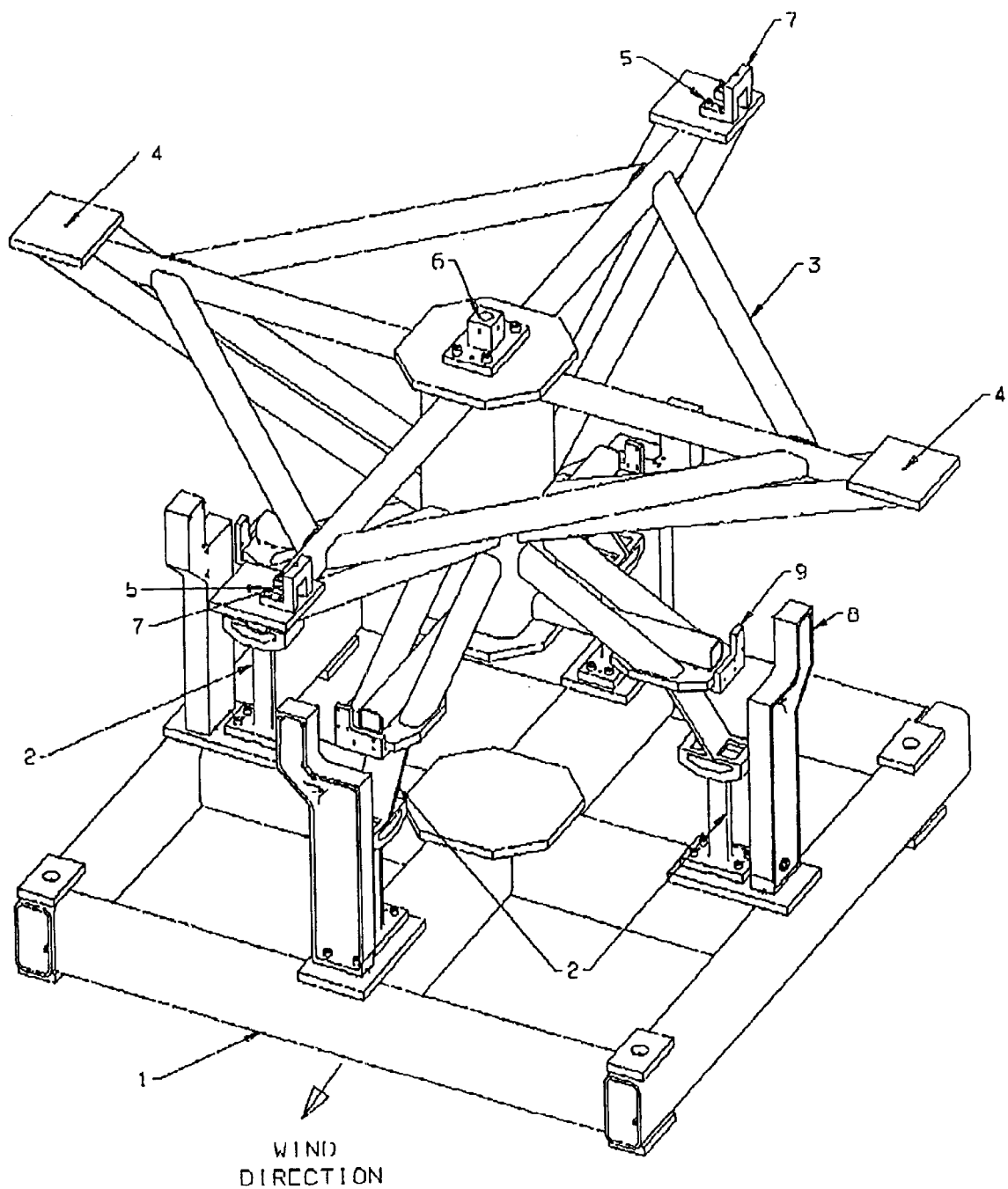
FIG. 1 is an isometric view of an embodiment of the system in the testing configuration.
Figure 2:
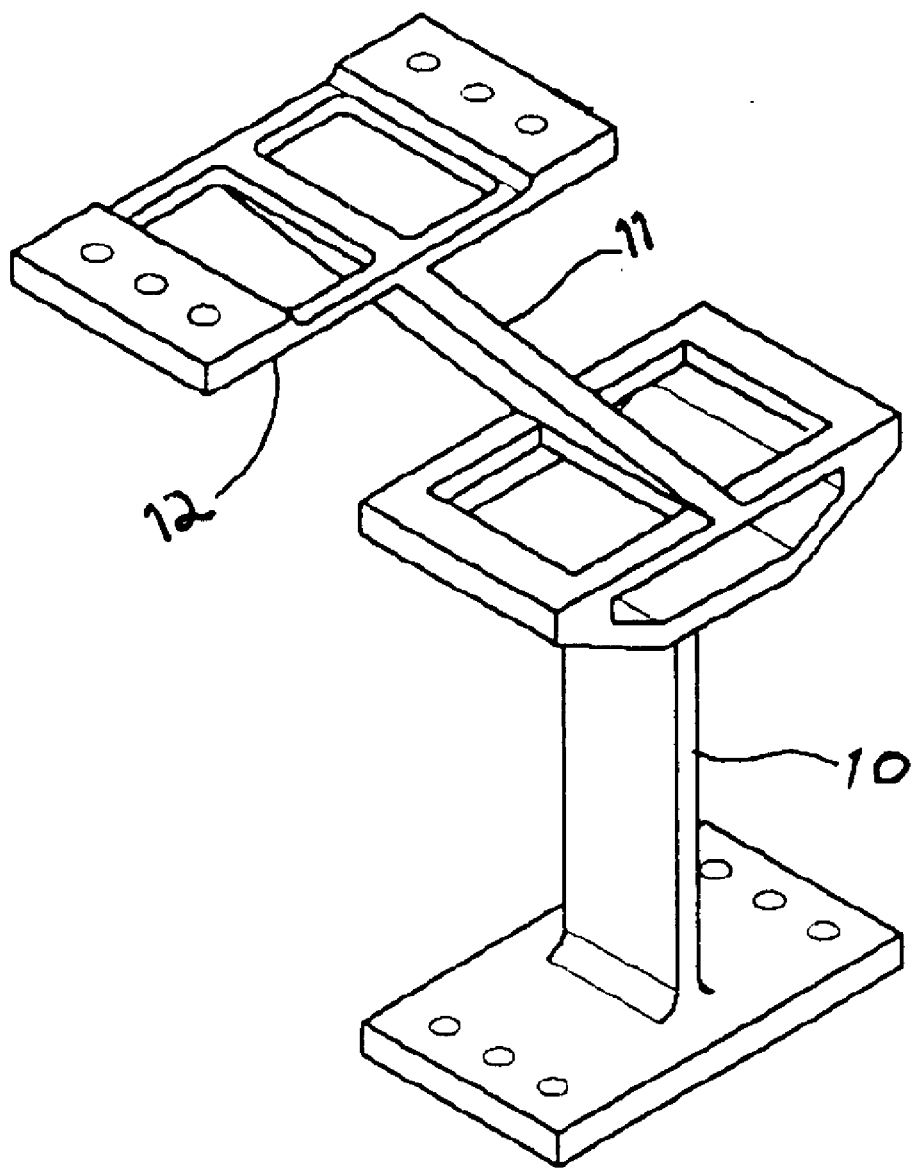
FIG. 2 is an isometric view of one of the prototype flexures.
Figure 4:
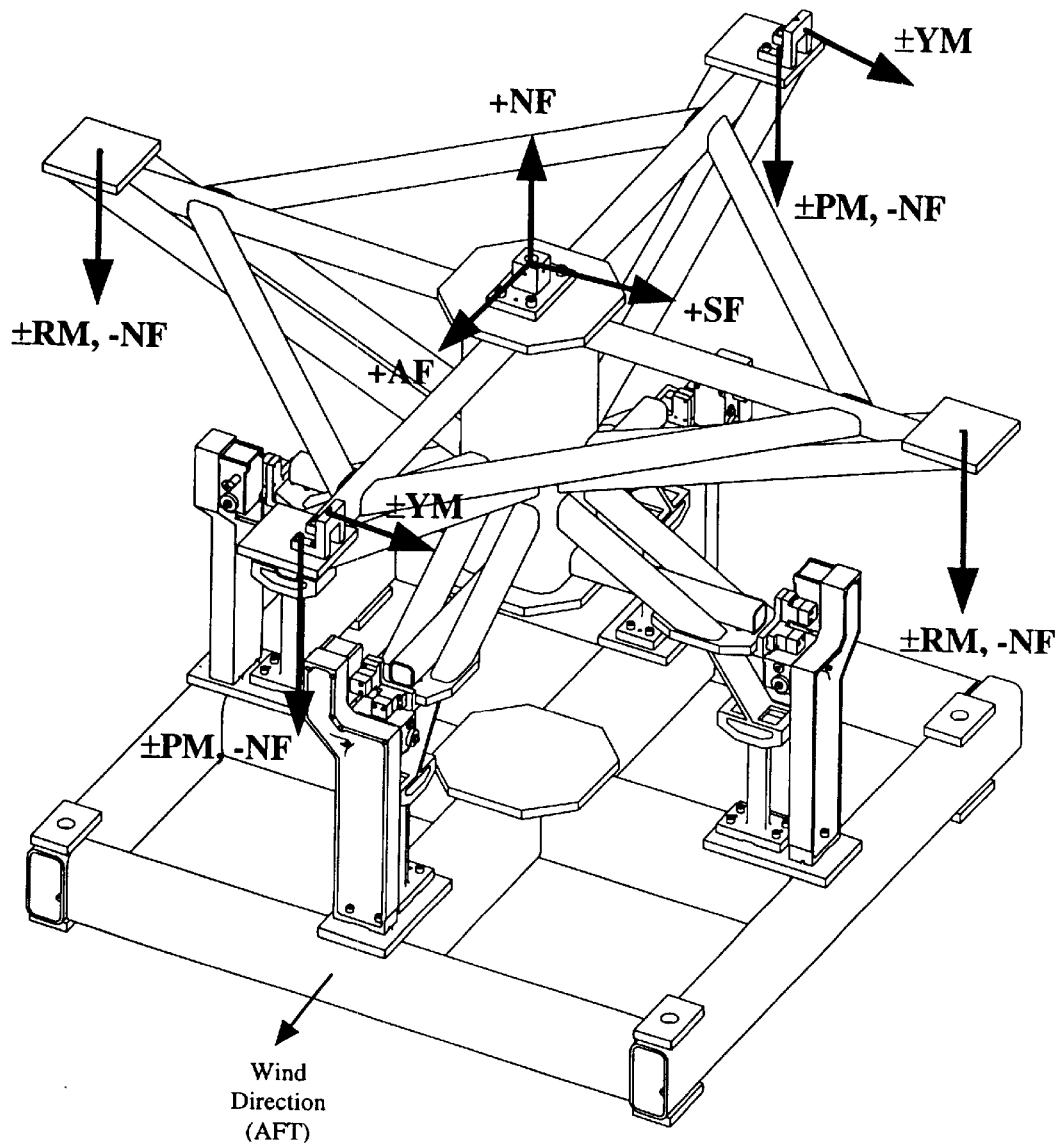
FIG. 4 is an isometric view of the embodiment that depicts how the calibration loads are applied.

The configuration of the balance is shown in FIG. 1. The key parts of the design are the flexures 2, which together provide the degrees of freedom. The flexures are designed to deflect 0.010" due to each maximum component load. The flexure design for the prototype is made up of several sections to provide the needed degrees of freedom. In FIG. 2, 10 is the portion that provides a degree of freedom for drag and side. The angled section 11 allows a degree of freedom for pitch and roll. The horizontal section 12 increases the degree of freedom for lift and yaw. The primary degree of freedom for lift and yaw is a combination of 10, 11 and 12. The number of flexures is driven by the loads applied as well as the size limitations on the balance. The flexures are mounted to the ground 1 and the metric frames 3 as shown in FIG. 1. The displacements that are measured are the position of the metric frame 3 with respect to the ground frame 1. The supports for the displacement sensors are 8 on the ground side and 9 on the metric side. The number of components being measured drives the number of sensors that are required. The metric frame 3 has an integral calibration body for testing. Loads are applied to the calibration body through several points. Lift force is applied to the calibration center fitting 6 in the positive direction. In the negative direction, equal loads are applied to points 4 and 5 for negative lift force. Side force and drag force are applied to the calibration center fitting 6. Pitching moment is applied by varying the load applied to points 5 and rolling moment is applied by varying the load applied to points 4. Yawing moment is applied by varying the load applied to the yaw loading brackets 7. A graphic representative of how all these loads are applied can be seen in FIG. 4. For use in a wind tunnel, the test article (model) will replace the calibration body portion of the metric frame 3 shown in FIG. 1.

Figure 3:
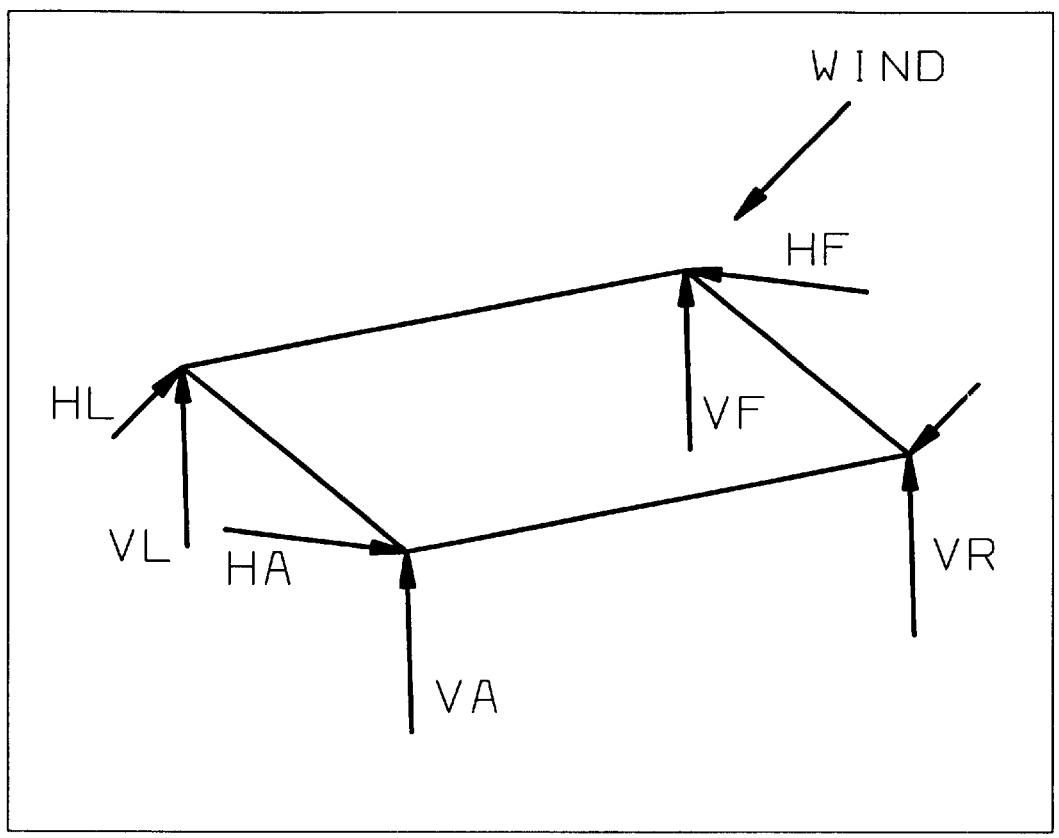
FIG. 3 is an isometric view showing the relative locations of the displacement sensors used in this design.

The displacement measuring sensors are located such that six components can be measured. A laser interferometric system is used in the present prototype design, but other displacement systems could also be used with a similar configuration. The present configuration utilizes eight displacement sensors that are located in pairs 90 degrees apart. An alternate configuration would include six sensors located in pairs 120 degrees apart. The four pairs include one sensor that measures a vertical displacement and one that measures a horizontal displacement. The sensors are mounted between the ground and metric sensor supports 8 and 9. The horizontal sensors (HA, HF, HL, HR) are set up to measure displacements in the horizontal plane and the vertical sensors (VA, VF, VL, VR) are set up to measure displacements in the vertical plane, as shown in FIG. 3. The eight measurements can then be resolved into the three forces and three moments. This is performed as follows:

VF = Vertical Measurement in the Forward Position
VA = Vertical Measurement in the Aft Position
VR = Vertical Measurement in the Right Position
VL = Vertical Measurement in the Left Position
HF = Horizontal Measurement in the Forward Position
HA = Horizontal Measurement in the Aft Position
HR = Horizontal Measurement in the Right Position
HL = Horizontal Measurement in the Left Position.

1) Lift — Lift will be proportional to the sum of the four vertical sensors (VF + VR + VA + VL).
2) Drag — Drag is proportional to the difference between the vertical forward and aft sensors (HR − HL).
3) Side — Side is proportional to the difference between the horizontal forward and aft sensors (HA − HF).
4) Pitch — Pitch is proportional to the difference between the vertical forward and aft sensors (VF − VA).
5) Roll — Roll is proportional to the difference between the vertical left and right sensors (VL − VR).
6) Yaw — Yaw is proportional to the difference between the sum of opposing horizontal sensors ((HR + HL) − (HF + HA)).

The preceding and further advantages will appear to those skilled in the art upon a reading of the foregoing specification.

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

What is claimed is:

1. A method for measuring forces and moments comprising:

displacement of a metric frame with respect to a ground frame for providing six degrees of freedom; and measuring the position of the metric frame with respect to the ground frame utilizing only a plurality of displacement sensors to provide force and moment components representative of said six degrees of freedom.

2. The method of claim 1 wherein said plurality of sensors comprises eight displacement sensors arranged in pairs disposed 90 degrees apart.

3. The method of claim 1 wherein said plurality of sensors comprises six displacement sensors arranged in pairs disposed 120 degrees apart.

* * * * *